United States Patent Office 2,700,060
Patented Jan. 18, 1955

2,700,060

METHOD OF RECOVERING PARA-NITROCHLOROBENZENE

Herman Cherlow, North Plainfield, Edward H. Bart, Elizabeth, and Alfred G. Hill, Martinsville, N. J., assignors to American Cyanamid Company, New York, N. Y., a corporation of Maine No Drawing. Application March 23, 1953,
Serial No. 344,221

5 Claims. (Cl. 260—646)

The present invention relates to a process of separating p-nitrochlorobenzene from isomeric mixtures thereof.

In the commercial nitration of chlorobenzene with nitric acid to form mono-nitro derivatives, a mixture of products is formed. Thus, the reaction of stoichiometric quantities of nitric acid and chlorobenzene will produce approximately two parts of p-nitrochlorobenzene for each part of o-nitrochlorobenzene according to the following reaction:

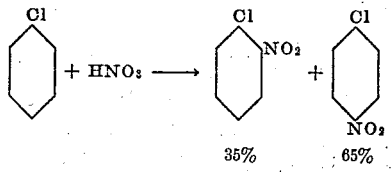

The separation of this isomeric mixture has always been difficult as will be better understood by reference to the physical properties of the ortho and the para isomers.

|  | o-nitrochlorobenzene | p-nitrochlorobenzene |
|---|---|---|
| melting point | 33° C | 83° C. |
| boiling point | 245° C<br>119°/8 mm | 242° C.<br>113°/8 mm. |

We have now discovered a chemical method which not only permits the recovery of p-nitrochlorobenzene free of the ortho isomer, but produces as the sole by-product a valuable intermediate, 2-nitrodiphenylamine.

This invention is carried out by reacting a mixture of the monochloronitrobenzenes with aniline under the proper conditions to yield a mixture of para-nitrochlorobenzene, and the end-product of the reaction between ortho-nitrochlorobenzene and aniline; namely, 2-nitrodiphenylamine. This mixture is separated into pure para-nitrochlorobenzene and nitrodiphenylamine by a simple distillation.

It is an advantage of our new process that expensive crystallization and distillation equipment is not required.

It is a further advantage of our invention that it is not limited to any particular mixture of monochloronitrobenzenes. Isomeric mixtures of the greatest economic interest are those which contain from about 1 to 2 parts o-nitrochlorobenzene mixed with approximately 2 to 1 parts of p-nitrochlorobenzene.

In the process of our invention the mixture of ortho and para isomers is reacted with an excess of aniline. The products of this reaction are not a mixture of 2-nitrodiphenylamine and 4-nitrodiphenylamine as one might expect. Under the conditions of our reaction, the aniline reacts almost exclusively with the o-nitrochlorobenzene. All but traces of the p-nitrochlorobenzene present originally in the reaction mixture may be recovered unchanged by distillation. The expected result of a competitive reaction between aniline and two similar organic halides would be a mixture of products formed from both halides. In the present reaction where the competition is between the o-nitrochlorobenzene and the p-nitrochlorobenzene, the reaction with o-nitrochlorobenzene will be diminished by the stearic hindrance of the nitro group in close proximity to the chlorine. It is all the more surprising therefore, 1) that all the o-nitrochloro- benzene reacts with aniline, and 2) that none of the p-nitrochlorobenzene reacts with aniline. Our reaction can be illustrated by the following equation:

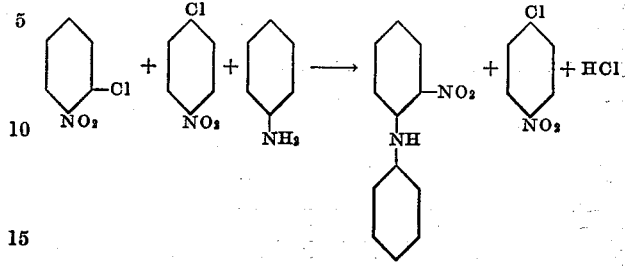

The 2-nitrodiphenylamine and the p-nitrochlorobenzene can be isolated by distillation as pure products.

While a stoichiometric quantity of aniline may be used in our reaction, an excess is desirable to reduce the reaction time and to insure complete reaction with all the o-nitrochlorobenzene. While we prefer to use at least 1.5 mols of aniline per mol of o-nitrochlorobenzene, there is no apparent advantage in using more than 20 mols of aniline per mol of o-nitrochlorobenzene.

We have found that this reaction may be accelerated and the excess aniline more readily recovered if an acid binding agent such as an alkali metal carbonate or bicarbonate, is added to the reaction mixture. The use of sodium carbonate is preferred because of its availability and low cost. We have found it convenient to use from 60% to 100% excess sodium carbonate based on the amount of chlorine present as o-nitrochlorobenzene.

The time and temperature of the reaction may vary within the range of 25 to 30 hours at 175°–205° C. The higher temperature range of 200 to 205° C. is more desirable in that greater conversion is obtained per unit of time. While a reaction time exceeding 30 hours does not appear to have a deleterious effect, the rate of reaction falls off to the point that heating in excess of 30 hours is not economical. Our invention will be further illustrated by the following examples.

Example 1

To 100 parts of a 67% o-nitrochlorobenzene, 33% p-nitrochlorobenzene mixture is added, 206 parts aniline and 67 parts soda ash. This mixture is heated to 175° C. and stirred for 30 hours during which time the temperature is increased to 200–205° C. Water formed by the reaction is removed as an azeotrope with aniline. Aniline separable from the condensed azeotrope vapors is returned to the reaction medium. The reaction mixture is then cooled to 80° C., 146 parts water added, the mixture stirred for ½ hour at 60–70° C. and then allowed to settle. The washed oil phase, of approximately 295 parts, is separated and distilled to give a composition as follows:

|  | Percent composition | Parts by weight |
|---|---|---|
| Water | 2 | 6 |
| Aniline | 55 | 163 |
| p-Nitrochlorobenzene | 11 | 33 |
| 2-Nitrodiphenylamine | 29 | 85 |
| Tar | 3 | 8 |

The nitrodiphenylamine needs no further purification for its customary uses and the p-nitrochlorobenzene is suitable for use in such operations as the manufacture of p-nitrophenol or p-nitraniline.

Example 2

To 100 parts of a commercial mononitrochlorobenzene of the following composition:

|  | Per cent |
|---|---|
| p-Nitrochlorobenzene | 63 |
| o-Nitrochlorobenzene | 36 |
| m-Nitrochlorobenzene | 0.5 |
| Dinitrochlorobenzenes and monochlorobenzene | 0.1 | is added 75 parts aniline oil and 34 parts soda ash. This mixture is heated to 175° C. and stirred for 30 hours during which time the temperature is further increased to approximately 200–205° C. Water formed by the reaction is removed as an azeotrope with aniline, separated and any separable aniline returned to the reaction mixture. The reaction mixture is cooled to 80° C., 74 parts water added, mixture stirred for ½ hour at 60–70° C. and then allowed to settle. The washed oil phase of approximately 169 parts is separated and subjected to fractionation to give a typical composition as follows:

|  | Percent composition | Parts by weight |
|---|---|---|
| Water | 2. | 3.4 |
| Aniline | 30.6 | 51.7 |
| p-Nitrochlorobenzene | 37.4 | 63.2 |
| 2-Nitrodiphenylamine | 27. | 45.6 |
| Tar | 3. | 5.1 |
|  | 100. | 169. |

The 2-nitrodiphenylamine needs no further purification and the p-nitrochlorobenzene is suitable for use in such operations as the manufacture of p-nitrophenol or p-nitraniline.

We claim:

1. A process for separating a mixture of o-nitrochlorobenzene and p-nitrochlorobenzene which comprises heating said mixture in the presence of an excess of aniline until reaction is complete and separating the p-nitrochlorobenzene from the reaction product, 2-nitrodiphenylamine, by distillation.

2. A process for separating a mixture of o-nitrochlorobenzene and p-nitrochlorobenzene which comprises heating said mixture in the presence of an excess of aniline at a temperature of about 175° C. to 205° C. until reaction is complete and separating the p-nitrochlorobenzene from the reaction product, 2-nitrodiphenylamine, by distillation.

3. A process for separating a mixture of o-nitrochlorobenzene and p-nitrochlorobenzene which comprises heating said mixture in the presence of an excess of aniline and a carbonate alkali at a temperature of about 175° C. to 205° C. until reaction is complete and separating the p-nitrochlorobenzene from the reaction product, 2-nitrodiphenylamine, by distillation.

4. A process for separating a mixture of o-nitrochlorobenzene and p-nitrochlorobenzene which comprises heating said mixture in the presence of an excess of aniline and sodium carbonate at a temperature of about 175° C. to 205° C. until reaction is complete and separating the p-nitrochlorobenzene from the reaction product, 2-nitrodiphenylamine, by distillation.

5. A process for separating a mixture of o-nitrochlorobenzene and p-nitrochlorobenzene which comprises heating said mixture in the presence of an excess of aniline and sodium carbonate at a temperature of 175° C. to 205° C. for about 30 hours; removing the water formed by the reaction as an azeotrope with aniline; separating this water from the azeotrope and returning the recovered aniline to the mixture; washing this mixture with water, separating the mixture from the water and distilling the mixture to separate the p-nitrochlorobenzene and 2-nitrodiphenylamine.

References Cited in the file of this patent

UNITED STATES PATENTS

| 1,401,631 | Moran | Dec. 27, 1921 |
| 1,903,030 | Davis | Mar. 28, 1933 |
| 1,981,311 | Dahlen et al. | Nov. 20, 1934 |